March 22, 1966 A. WYZENBEEK 3,241,369
SIGHT GLASS AND METHOD OF MAKING SAME
Filed March 9, 1962 2 Sheets-Sheet 1

INVENTOR.
ANDREW WYZENBEEK
BY
J. Warren Kinney Jr.
ATTORNEY

March 22, 1966  A. WYZENBEEK  3,241,369
SIGHT GLASS AND METHOD OF MAKING SAME
Filed March 9, 1962  2 Sheets-Sheet 2

INVENTOR.
ANDREW WYZENBEEK
BY
ATTORNEY

United States Patent Office 3,241,369
Patented Mar. 22, 1966

3,241,369
SIGHT GLASS AND METHOD OF MAKING SAME
Andrew Wyzenbeek, Cincinnati, Ohio, assignor to Fusite Corporation, Cincinnati, Ohio, a corporation of Ohio
Filed Mar. 9, 1962, Ser. No. 178,699
4 Claims. (Cl. 73—331)

This invention relates to a sight glass, and more particularly to a sight glass having a lens formed integrally therewith and shaped in such a manner as to be subjected to compressive forces incident to and by the application of pressure thereto.

An object of the invention is to teach a method of producing a sight glass having the hereinabove described characteristics.

Another object of the invention is to provide a sight glass of the type which comprises a tubular metallic body one end of which is provided with a lens which is fused and hermetically sealed thereto and which has an outer concave surface.

A further object of the invention is to provide a sight glass having a lens integrally associated therewith and formed in such a manner as to be strong in compression and which is so associated with the metallic body portion of the unit whereby to be subjected to compressive forces incident to the application of an internal pressure thereto.

These and other objects are attained by the means described herein and as disclosed in the accompanying drawings, in which.

Figures 1, 2:
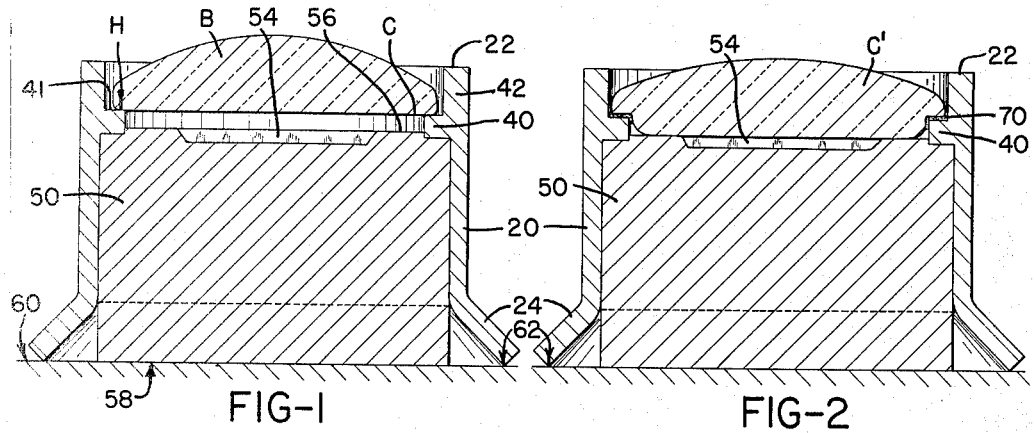
FIGS. 1-4 are sectional views of a sight glass embodying the teachings of the present invention illustrating the sequential steps in producing such a device.

With particular reference to the figures, the numeral 20 denotes an elongate tubular housing or body portion fabricated from low carbon steel and/or stainless steel in the 400-300 series, or the like, one end of which terminates in a free outer open or terminal end 22, and the other end of which may be flared outwardly as at 24 for providing a continuous, peripheral mounting flange. With particular reference to FIGS. 4, 5, 6, 10, and 11, the numeral 30 denotes a lens having an outer concave surface 32 and an inner surface 34 which is substantially flat and at substantial right angles with the longitudinal axis of body member 20. The inner surface of the lens may be provided with a plurality of elongate, rib-like protuberances 36 which provide a magnifying effect, as well known in the art.

One of the primary objects of the present invention is to provide a lens 30 integral with body 20, wherein the shape of the lens and its relationship with the tubular body is such that the lens will be subjected to compressive stresses incident to the application of pressures interiorly of the body.

In the embodiment illustrated in FIGS. 1-6, the body member 20 is provided with an integral, inwardly projecting, radial, continuous axial lip 40 spaced from outer edge 22, and, in the particular embodiment illustrated, the thickness of the body wall beyond lip 40 has been increased somewhat as at 42.

The glass lens may be integrated with body 20 by the steps illustrated in FIGS. 1-4 in which the numeral 50 denotes a plug of carbon or other inert material dimensioned to be snugly received within the lower open end of the tubular body for locating its upper surface as illustrated. The upper surface of the plug is provided with whatever configuration is to be produced in inner face 34 of the completed lens, that is, cavities 54 and planar surfaces 56 for providing protuberances 36 and flat surfaces 34 in the lens.

The bottom or lower end 58 of the plug may rest upon a supporting surface 60 which is also engaged by peripheral edge 62 of flange 24.

A pre-formed glass blank or lens B may be placed in the outer end of body member 20 with the outer lower face thereof being supported on and in contacting relationship with the upper surface 41 of lip 40. As clearly evident from FIG. 1, the diameter of lens blank B may be less than the inner diameter of outer portion 42 of the body member.

Figures 3, 4:
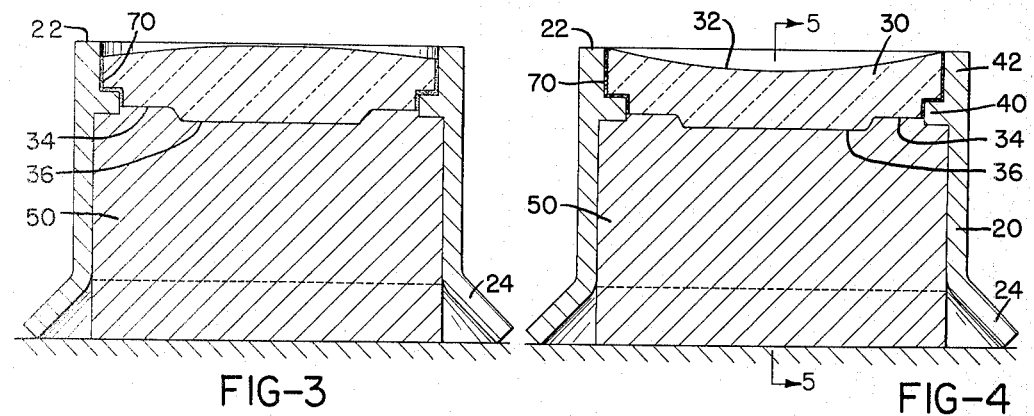

The plug, body member, and glass blank of FIG. 1 heating operation will be performed in a suitable atmosphere until the lens softens sufficiently to wet the adjacent surfaces of the metal as illustrated in FIGS. 2, 3, and 4.

As the blank is initially softened, its lower surface C (FIG. 1) will tend to assume the position C' illustrated in FIG. 2. It will be noted that the glass will initially be fused to the body at 70; and as the heating operation is continued, the wetting action will continue to occur as evident from a comparison of FIGS. 2, 3, and 4, until the outer peripheral edge of the blank has wetted the inner surface of tubular portion 42 of the body up to outer surface 22 thereof. The aforesaid wetting action exerts a stronger force than the surface tension of the glass with the result that the outer surface 32 of the lens will assume a concave shape as illustrated in FIGS. 4 and 5.

It should, of course, be understood that the aforesaid heating operation will be performed in a suitable atmosphere which will induce and augment the ability of the glass to wet the surface of the metal whereby to achieve a chemical bond between these two substances because of the affinity of the molten glass and the controlled oxide film on the metal, such as, by way of example, will occur at red heats in the neighborhood of 1750° Fahrenheit.

Figures 5, 6:
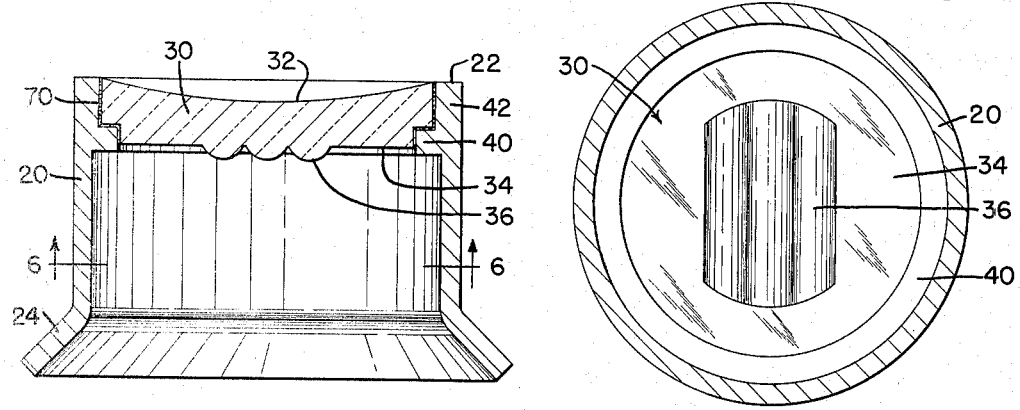
FIG. 5 is a sectional view taken on line 5—5 of FIG. 4.
FIG. 6 is a sectional view taken on line 6—6 of FIG. 5.

As clearly illustrated in FIGS. 4, 5 and 6, the lower surface 34 of the lens will be substantially planar and include the protuberances 36.

In FIGS. 7-10 I have illustrated a different technique which may be followed in the procedure of fabricating a sight glass according to the teachings of the present invention.

Figure 7:
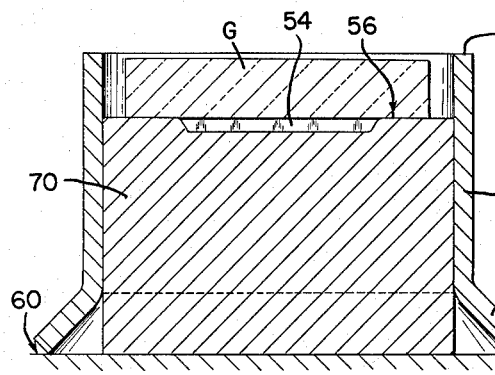
FIGS. 7-10 are similar to FIGS. 1-4 and illustrate a modified technique in the process of fabricating a sight glass embodying the teachings of the present invention.
Figure 8:
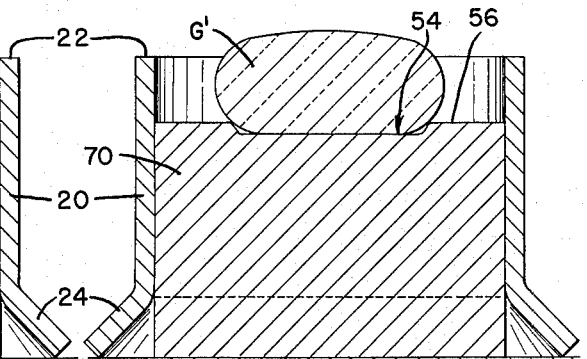
Figure 9:
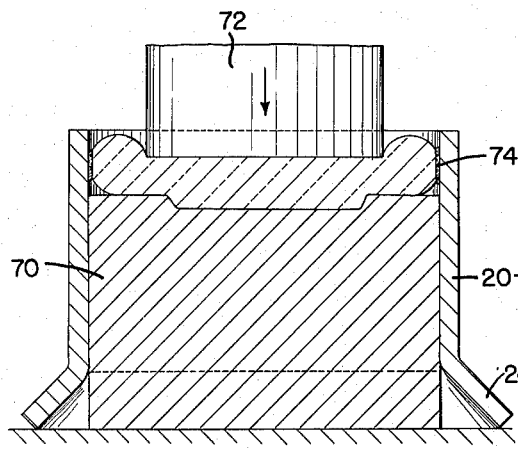
Figure 10:
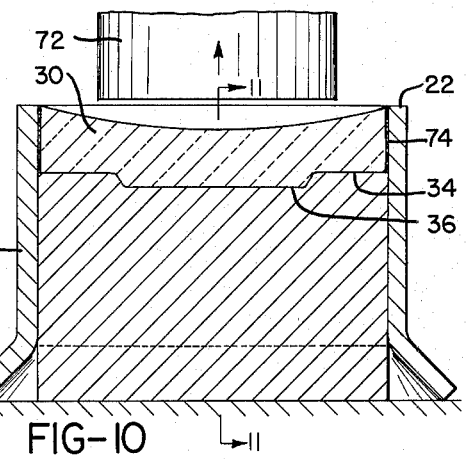

The tubular body 20 is substantially cylindrical and has a uniform internal diameter throughout its length. A plug member 70 of inert material is received within the lower end of the body, and a glass blank G deposited on the upper surface thereof, as illustrated in FIG. 7, after which the entire assembly is suitably heated for providing a globule G' of softened glass as in FIG. 8. After the glass has thus been softened, a suitable plunger 72 of inert material may be lowered into contacting relationship therewith and then pressed into said globule for radially expanding it while reducing its thickness. Such radial expansion will result in the outer surface of said globule contacting and wetting the inner face of body 20 as at 74, after which the plunger element 72 may be withdrawn upwardly as in FIG. 10. Heating is continued until such time as the glass has wetted and become fused to those portions of the interior face of the body member between the upper face of the plug and outer edge 22 of the body member, as in FIG. 10, at which time the lower face of the glass will have assumed the pattern provided in the upper face of the plug and the outer surface 32 will have assumed the concave shape as illustrated.

The degree of concavity of the outer face 32 of a lens is a function of the amount of glass used and of the amount or degree to which the metal of the body is wetted by the glass during the bonding or fusing operation.

Glass is comparatively weak in tension but quite strong in compression; and the coefficient of expansion of the metal body is higher than the coefficient of expansion of the glass. The foregoing phenomenum results in the forces generated in the metallic body subjecting the glass lens to radial compression, at which time the upper and lower edges of the lens will be put in shear. Accordingly the device per se is highly resistant to heat shock such as, by way of example, occurs when the mounting of flange 24 is permanently secured by resistance welding to the wall of metallic housing through which the tubular portion 20 projects in outwardly spaced relationship therewith.

Figure 11:
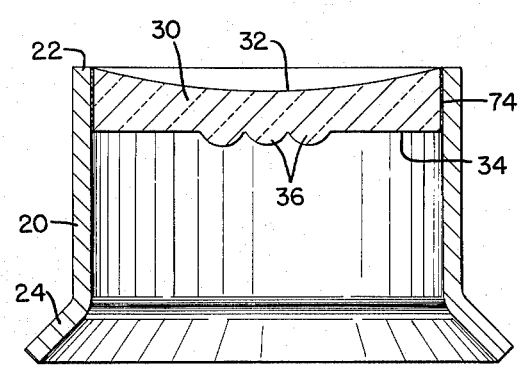
FIG. 11 is a sectional view taken on line 11—11 of FIG. 10.

The concavity of the outer surface of the lens effectively prevents the axial stresses induced in tubular portion 20 when the mounting flange 24 is subjected to resistance welding temperatures from damaging the bond between the lens and said tubular portion. The thickness of a lens 30 at its thinnest section is considerably less than ¼ inch, being in the neighborhood of ⅛ inch; however, sight glasses, as illustrated in FIGS. 5 and 11, easily withstand hydrostatic pressures of at least 2000 pounds applied interiorly of body portions 20. Heretofore glass lenses an inch or more in thickness were required to withstand hydrostatic pressures of such values.

The lens of the present invention is not only less expensive and more resistant to hermetic leakage and corrosion than the prior art lenses, it is also more useful and efficient in that it enables an operator to more readily and clearly observe fluid level, or other conditions within the housing with which the sight glass is associated.

From the foregoing, it will be noted that I have thus provided a glass lens in the end of a tubular metallic body member wherein the lens is permanently and rigidly bonded directly to the metal with the outer peripheral edge of the lens extending out to the surface of the outer end 22 of the body member, and with the outer surface of the lens concave and the inner surface flat except for outwardly projecting lens-forming protuberances.

Figure 12:
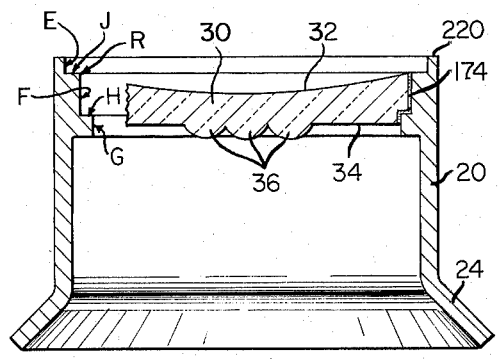
FIG. 12 is a vertical sectional view of another modification of a sight glass assembly embodying the teachings of the invention.

With reference now to FIG. 12, it will be noted that the tubular body member 20 is provided with an integral, inwardly projecting, continuous, radial lip 40 located inwardly from end 220, said lip including an upper radial surface H at substantial right angles with axial surfaces F and G, which latter surfaces are substantially parallel with the longitudinal axis of body member 20.

The upper end of cylindrical surface F is defined by radial surface J which is in substantial parallelism with surface H and which defines a sharp, well-defined corner or peripheral edge R at the intersection of surfaces F and J.

Axial or cylindrical surface E may be of the same diameter as the diameter of the body member below lip 40.

Lens 30 may be fused as at 174 to the body member as hereinabove broadly described with reference to FIGS. 1–6; however, for clarity of detail the steps will be restated with particular reference to the left side of FIG. 12.

A lens blank may be initially supported on radial surface H of lip 40, as in FIG. 1. The lens blank, plug and body member are then placed in an oven and heated in a suitable atmosphere until the lens softens sufficiently to initially wet radial surface H. Continued application of heat will result in the glass wetting the entire extent of surface H and thereafter those portions of axial surface G above plug 50; and axial surface F of the body member above radial surface H. The axial surface F will be wetted throughout its entire length up to corner R, said sharp corner acting as a barrier or stop line for limiting and defining the upper extent of the wetting of the body member by the glass.

In other words, in FIG. 12 the upper peripheral edge of the glass will be flush with radial surface J, which surface is, insofar as the relationship between the glass and body member is concerned, the equivalent of outer surface 22 of FIGS. 1–11.

In the modification of FIG. 12, axial surface E which projects upwardly from radial surface J and which extends between radial surfaces J and outer surface 220 of the body member provides an integral metallic ring which effectively protects the glass-to-metal seal against accidental or unintentional damage to the metal-glass bond at corner R.

It should be understood that in all instances it is essential that the softened glass be brought into direct and actual contact with portions of the body member in order to effect an initial wetting of the metal by the molten glass. In the modifications illustrated in FIGS. 1–5 and 12, the original glass blank from which the lens is fabricated is initially supported on the upper radial surface H of lip 40; whereas in FIG. 9 mechanical means such as, by way of example, plunger 72, must be utilized for the purpose of moving the heat-softened glass into contacting relationship with portions of the body member in order that the glass may contact and then wet the walls of said body member.

I claim:

1. A sight glass comprising an open-ended, elongate, hollow, cylindrical, metallic body having an upper lens end and a lower mounting end and which includes an inwardly projecting, continuous, radial lip having an inner axial surface and an upper radial surface which terminates in a second axial surface which terminates in a sharp corner defined by the intersection of said second axial surface with a second radial surface disposed below and in substantial parallelism with the upper end of said body, and a glass lens at the said upper end of the body, said lens having its periphery chemically bonded and fused directly to the upper radial surface of said lip, said second axial surface, and to portions of the inner axial surface of said lip, with the outer peripheral edge of said lens flush with the outer end of said second axial surface at said sharp corner, with portions of the inner surface of said lens being substantially flat and with the outer surface thereof being concave, the outer peripheral edge of said lens being spaced inwardly from the upper end of said body.

2. A sight glass characterized by its high resistance to heat shock consisting of a rigid metal housing constituting a hollow cylindrical portion, one end of which terminates in an outwardly flared welding flange, a glass lens secured under radial compression to, disposed interiorly of and spanning the other end of the cylindrical portion of the housing which is remote from said flared flange, said cylindrical portion having inner and outer walls and being of a length materially greater than the axial thickness of the lens, said lens having inner, outer and side portions wherein said side portions are fused directly to the metal of the inner wall of said housing, and wherein said inner portion defines a substantially flat inner surface spaced inwardly from said other end of the housing and wherein said outer portion defines a concave outer surface whose periphery is flush with the last mentioned end of the inner wall of said cylindrical portion, said concave outer surface resisting damage to the lens and its bond with said housing when subjected to axial stresses induced in the cylindrical portion of the housing when the flared flange thereof is subjected to resistance welding temperatures, said inner surface of the lens constituting the high pressure side and said concave outer surface constituting the low pressure side thereof.

3. A sight glass consisting of a rigid metal tube having an inner open end and an outer end, said outer end having a radially inwardly projecting annular lip forming an integral part of said tube, a glass lens secured under radial compression in and closing said outer end of the tube, the tube being of a length materially greater than the axial thickness of the lens, the lens having a substantially flat inner surface and having an outer spherical concave surface of a diameter equal to the inner diameter of the tube in the outer end portion thereof in which the lens is secured, said lip being disposed inwardly from the said concave side of the lens and having a radial outer surface and an axial surface, the lens having portions engaging said radial and axial surfaces, said lens being fused directly to the tube and said radial and axial surfaces, said tube having a portion of the inner end thereof formed to provide a flaring welding flange for mounting the tube in operative connection with a metallic support, said concave outer surface of said lens resisting destruction of the lens when the same is subjected to axial stresses in the tube resulting from subjecting the said flange to resistance welding temperatures.

4. The invention according to claim 3, wherein a portion of the tube extends beyond the concave side of the lens and is of an inside diameter greater than the lens whereby there is formed a protective ring for the glass-to-metal bond.

References Cited by the Examiner

UNITED STATES PATENTS

| | | | |
|---|---|---|---|
| 773,154 | 10/1904 | McFerran | 73—327 |
| 1,074,493 | 9/1913 | Cross et al. | 73—331 |
| 1,507,926 | 9/1924 | Mendenhall | 73—331 |
| 2,155,270 | 4/1939 | Johnson | 220—82 |
| 2,345,889 | 4/1944 | Talbot | 73—331 |
| 2,486,101 | 10/1949 | Beggs | 65—59 |
| 2,744,487 | 5/1956 | Moore et al. | 116—117 |
| 2,765,661 | 10/1956 | Thomas | 73—334 |
| 2,784,532 | 3/1957 | Griffiths | 65—59 |
| 2,942,469 | 6/1960 | Le Roy | 73—334 |
| 2,946,156 | 7/1960 | Bailey | 116—117 X |

FOREIGN PATENTS 572,020   9/1945   Great Britain.

ISAAC LISANN, *Primary Examiner.*